United States Patent

[11] 3,593,111

| [72] | Inventor | Herbert Moerlein<br>Chicago, Ill. |
|---|---|---|
| [21] | Appl. No. | 830,251 |
| [22] | Filed | June 4, 1969 |
| [45] | Patented | July 13, 1971 |
| [73] | Assignee | Chicago Condenser Corporation<br>Chicago, Ill. |

[54] VOLTAGE REGULATING DEVICE UTILIZING SERIES TRANSISTORS CONTROLLED BY MEANS INCLUDING ZENER DIODES
10 Claims, 6 Drawing Figs.

[52] U.S. Cl. ................................................. 323/17,
321/18, 323/22 T, 323/39
[51] Int. Cl. ............................................. G05f 1/44,
H02m 7/20
[50] Field of Search .............................................. 323/4, 9,
16—22, 22 T, 24, 39; 321/16, 18

[56] References Cited
UNITED STATES PATENTS
3,109,979 11/1963 Faulkner et al................ 323/22 (T)
3,153,187 10/1964 Klees............................. 323/24 X
3,308,373 3/1967 Shaum.......................... 323/22 (T)

*Primary Examiner*—Gerald Goldberg
*Attorney*—Burmeister, Palmatier & Hamby

ABSTRACT: A device for controlling the peak amplitude of an alternating current wave utilizing an alternating current control circuit. The alternating current control circuit employs a transistor connected between the input and output terminals of the device for reducing the amplitude of the output to a controlled level in response to a control signal impressed on the transistor. The control signal is generated by a zener diode having a breakdown potential at the controlled level connected in series with the primary of a control transformer across the input terminals, the output of the transformer being connected across the transistor to oppose the alternating current input impressed thereon. Duplicate circuits are used between corresponding input and output terminals of the device.

Inventor
Herbert Moerlein
By Burmeister, Palmatier & Hamby
Attorneys

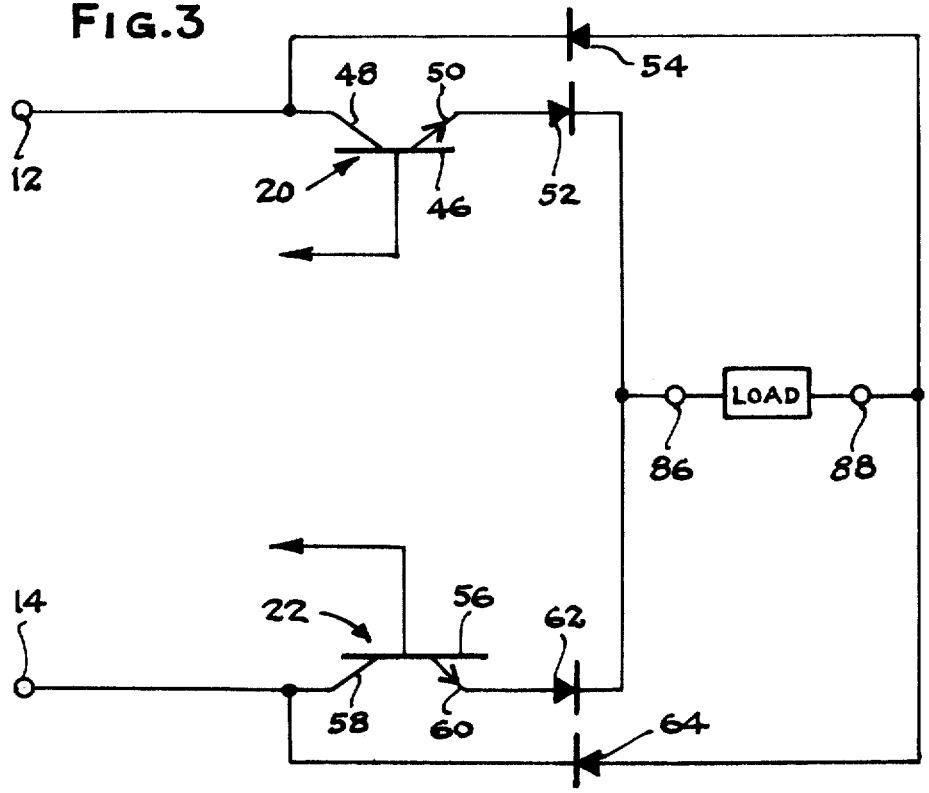
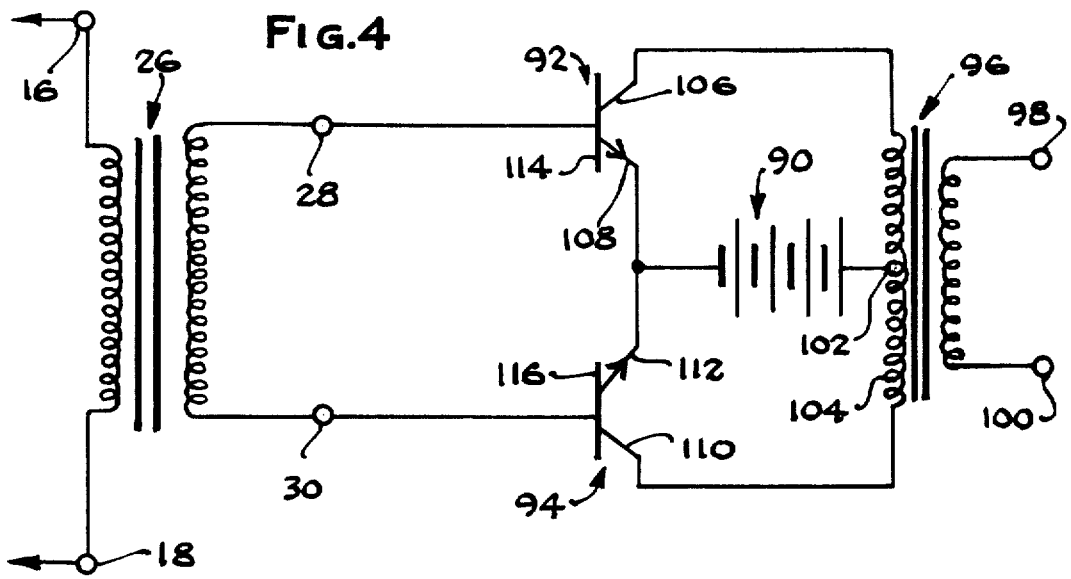

Inventor
Herbert Moerlein
By Burmeister, Palmatier & Hanby
Attorneys

VOLTAGE REGULATING DEVICE UTILIZING SERIES TRANSISTORS CONTROLLED BY MEANS INCLUDING ZENER DIODES

The present invention relates to devices for controlling the peak amplitude of alternating current signals. In particular, the present invention relates to regulated voltage power supplies.

Regulated voltage power supplies generally utilize voltage regulating tubes or constant voltage transformers. Voltage regulating tubes are direct current devices, and hence require rectification. The present invention is directed to an alternating current control of an alternating current source.

It is a further object of the present invention to provide a direct current output from a power source utilizing an alternating current control of an alternating current source.

Constant voltage transformers have been relatively costly to construct. It is an object of the present invention to provide a regulated alternating current supply which is less costly than those utilized in constant voltage transformers.

Most constant voltage transformers exhibit relatively poor output waveform. It is an object of the present invention to provide an alternating current regulated power source having substantially improved waveform from that of conventional constant voltage transformer power sources.

These and further objects of the present invention will be readily apparent to those skilled in the art from a further consideration of the specification, particularly when viewed in the light of the drawings, in which:

FIG. 3 is a modified regulated power supply constructed according to the teachings of the present invention and producing a direct current output from an alternating current input;

FIG. 4 is a schematic electrical circuit diagram of a regulated alternating current power supply utilizing a constant potential direct source constructed according to the teachings of the present invention.

Figure 1:
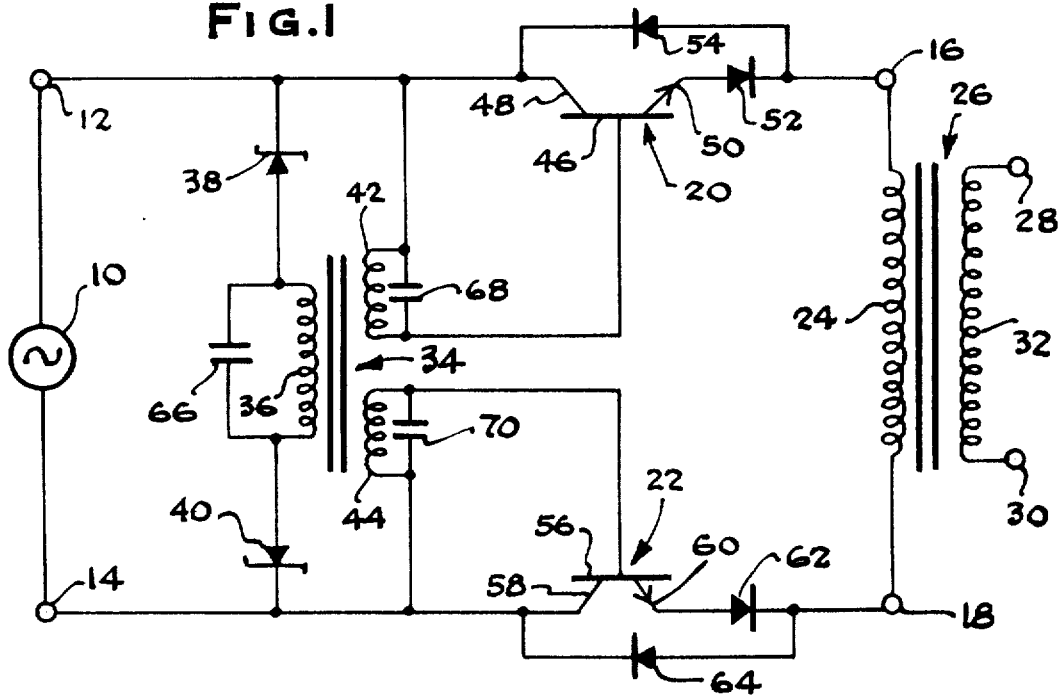
FIG. 1 is a schematic electrical circuit diagram of a voltage regulated power supply constructed according to the teachings of the present invention.

In FIG. 1, an unregulated alternating current source is indicated by the symbol designated 10. This source is connected to input terminals designated 12 and 14 of the regulating device. The terminal 12 of the regulating device is coupled to an output terminal 16 while the terminal 14 is coupled to an output terminal 18. A first transistor 20, to be more fully described hereinafter, is electrically connected between the terminals 12 and 16, and a second transistor 22 is electrically connected between the terminals 14 and 18. In FIG. 1, a load in the form of a primary 24 of an output transformer 26 is connected between the output terminals 16 and 18, and the regulated alternating current output appears across the terminals 28 and 30 of a secondary winding 32 of the transformer 26.

The transistors 20 and 22 are a part of a voltage regulating circuit which also includes a transformer 34. The transformer 34 has a primary winding 36 which is connected to terminal 12 through a zener diode 38 and to terminal 14 through a second zener diode 40. The zener diodes 38 and 40 are connected with opposing forward directions. The transformer 34 also has a pair of secondary windings 42 and 44. The secondary windings 42 and 44 are identical and develop the same potentials thereacross. The winding 42 is connected between the terminal 12 and a base 46 of the transistor 20, the transistor 20 having a collector 48 also connected to the terminal 12 and an emitter 50 connected to the output terminal 16 through a diode 52. A second diode 54 is connected between the collector 48 and the output terminal 16. The transistor 20 and diode 52 are connected to pass current between the input terminal 12 and the output terminal 16, but the diode 54 is connected to pass current in the opposite direction.

In like manner, the secondary winding 44 is connected between a base 56 and collector 58 of the transistor 22. The collector 58 is connected to the input terminal 14. The transistor 22 also has an emitter 60 connected to the output terminal 18 through a third diode 62. A fourth diode 64 is connected between the output terminal 18 and the input terminal 14. The transistor 22 and third diode 62 are connected to pass current from the input terminal 14 to the output terminal 18, while the fourth diode 64 is connected to pass current in the opposite direction.

The secondary 42 of the transformer 34 is polarized to place a potential between the collector 48 and the base 46 of the transistor 20 which opposes the potential of the source applied between the collector 48 and emitter 50. In like manner, the secondary winding 44 of the transformer 34 is polarized to place a potential between the base 56 and collector 58 of the transistor 22 which opposes the potential of the source impressed on the collector 58 and emitter 60 of the transistor 22.

The zener diodes 38 and 40 are utilized as devices for achieving a fixed potential drop in the forward direction, and for achieving conduction in the reverse direction. Hence, the primary 36 of the transformer 34 will always be subjected to a current determined by the resistance of the winding and a potential thereacross at a magnitude equal to the difference between the potential impressed upon the input terminals 12 and 14 by the source 10 and the zener breakdown potential. A condenser 66 is connected in parallel with the primary 36 of the transformer 34 to provide a power factor correction, and condensers 68 and 70 are connected in parallel with the secondary windings 42 and 44, respectively, to provide power factor corrections.

Figure 2:
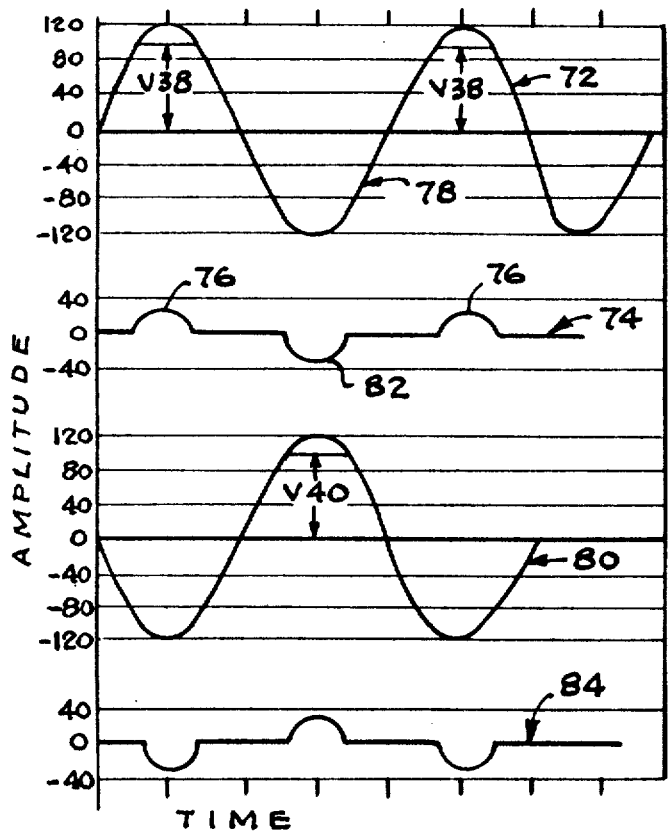
FIG. 2 is a graph illustrating waveforms at various points in the circuit of the regulated power supply of FIG. 1.

FIG. 2 illustrates the positive portion of each cycle from the power source 10 that is impressed upon the input terminal 12 and is significant in the operation of the voltage regulating device over half of its cycle. The waveform shown in FIG. 2 is impressed upon the transistor 20. For ease of understanding, it will be assumed that the power source 10 delivers a potential between 105 and 130 volts AC, curve 72 indicating the peak amplitude to be approximately 120 volts. In accordance with the present invention, the regulated voltage appearing across the terminals 16 and 18 will be the minimum potential anticipated in the source potential, namely in the illustration 105 volts AC. To achieve 105 volts AC, the maximum 130 volts input must be reduced by 25 volts. It is also to be noted that the output potential from the regulating power source may be regulated at any desired value within reasonable limits due to the turns ratio of the transformer 26. If for example, it is desired to achieve 115 volts AC regulated, the turns ratio of the transformer 26 in the specific illustration will step up the 105 volt input applied to the primary 24 to achieve an output regulated voltage of 115 volts across the secondary 32.

FIG. 2 illustrates the zener breakdown potential for the zener diode 38 in curve 72, this potential being designated $V_{38}$. The curve 74 of FIG. 2 illustrates the waveform of the current flowing through the zener diode 38. It will be noted that the positive portions of the waveform 72 result in positive pulses 76 in the waveform of the curve 74. These positive pulses represent the difference in potential above the fixed potential $V_{38}$ and the amplitude of the output of the source 10, as indicated in curve 72. It will also be noted that between the positive portions of the curve 72 is a negative portion designated 78. The negative portion 78 is with respect to zener diode 38 in the reverse direction, and zener diode 38 therefore simply acts as a conductor with respect to the negative portion of the waveform impressed on the source 10. However, zener diode 40 is subjected to the waveform designated 80 in FIG. 2 and is experiencing a positive portion of the input wave at the moment zener diode 38 is experiencing a negative portion of the wave. The zener diode 40 has a breakdown potential $V_{40}$ which is equal to the breakdown potential $V_{38}$ of the zener diode 38, and hence the flow of current through the winding 36 of the transformer 32 is limited by the zener diode 40 during the negative portions of the input waveform as impressed upon the input terminal 12, thus resulting in the negative pulse 82 set forth in curve 74. Curve 84 represents the potential appearing on the terminal 14, and for completeness, the current flow through the zener diode 40 has been illustrated in curve 84. It is to be noted that the waveform in curve 84 is reversed from that of curve 74 to illustrate that the forward directions of zener diodes 38 and 40 are oppositely connected.

The transformer 34 has a step-up turns ratio to overcome circuit losses, and each of the secondary windings 42 and 44 develops an alternating potential thereacross which is equal to the potential from the alternating current source 10 and the arbitrarily selected regulated potential appearing on the terminals 16 and 18, this potential being equal to the zener breakdown potential of the zener diodes 38 and 40. The potential appearing across the secondary 42 is rectified by the transistor 20 and opposes the rectified current from the source 10 appearing on the emitter of the transistor 20. The diode 52 permits the rectified current from the transistor 20 to flow to the output terminal 16, but prevents current flowing through the transistor 20 during negative portions of the input waveform with respect to the terminal 12. The diode 54 is utilized to conduct current across the transistor 20 during such negative portions of the input waveform cycle.

In like manner, transistor 22 functions to provide a rectified and regulated current on the emitter 60 thereof during the portions of the input waveform in which the input terminal 14 is positive. Hence, the terminals 16 and 18 are subjected to maximum alternating potentials of the regulated value.

It is to be noted that the foregoing voltage regulating device achieves control of alternating current with an alternating current input by means of transistors. Further, the amount of power required to achieve control is small compared to the output power. Line transients which may be present in the output of the source 10 are cancelled in the control circuit. Further, the regulating device is not limited as to frequency, except by the characteristics of the components utilized.

FIG. 3 illustrates a modified construction of the voltage regulating device which produces a direct current output. In the construction of FIG. 3, identical elements to that shown in FIG. 1 bear identical reference numerals. The two diodes 52 and 62 which are connected to the emitters of the transistors 20, 22 respectively are interconnected, and connected to a first output terminal designated 86. The other two diodes designated 54 and 64 which are connected to the collectors of the transistors 20 and 22, respectively, are also interconnected and connected to an output terminal 88. The load is then connected across the output terminals 86 and 88. Since either the transistor 20 or the transistor 22 will be conducting, and then only for the positive side of the cycle impressed thereon, the terminal 86 will become positively charged at the regulated potential. In like manner, either the diode 54 or the diode 64 will be conducting when impressed with the negative portion of the input potential, thereby impressing a negative potential on the output terminal 88. It is therefore to be noted that an unregulated alternating current source can be converted by the regulating device into a regulated direct current output.

FIG. 4 illustrates a circuit for utilizing a relatively small control alternating current potential and a relatively large direct current source to produce a relatively large regulated alternating current output. The regulating device shown in FIG. 1 is utilized to produce a regulated alternating current output on the transformer 26, as previously described, and this transformer and the output terminals 28 and 30 are illustrated in FIG. 4. A direct current power source, such as a battery 90 is utilized in conjunction with a pair of transistors 92 and 94 and a transformer 96 to produce a sinusoidal regulated output on output terminals 98 and 100. The battery 90 is connected to a center tap 102 in a primary winding 104 of the transformer 96. The transistor 92 has a collector 106 connected in a series circuit with a portion of the primary winding 104, the battery 90, and an emitter 108 of the transistor 92. In like manner, the transistor 94 has a collector 110 connected in a series circuit with the other portion of the primary winding 104 of the transformer 96, the battery 90, and an emitter 112 of the transistor 94.

The transistor 92 is thus the controlling element in a series circuit utilizing half of the primary winding 104 of the transformer 96 and the direct current source or battery 90. In like manner, the transistor 94 is the controlling element in a circuit including the other half of the primary winding 104 of the transformer 96 and the direct current source or battery 90. Since the transistors 92 and 94 have bases 114 and 116, respectively, which are connected to the terminals 28 and 30, respectively, of the voltage regulating device, these bases will alternately be placed at a positive potential of regulated amplitude. The transistor with a base with a positive amplitude will therefore conduct, causing current to flow through that portion of the primary connected in the circuit with that transistor. Since current will be flowing in the same direction relative to the battery 90 at all times, current will be reversing in the primary of the transformer 96 in accordance with the output from the regulated alternating current source appearing on the terminals 28 and 30. Hence, a regulated alternating current output is achieved from the direct current source or battery 90. It is of course necessary that the direct current source or battery 90 have a fixed potential.

Figure 5:
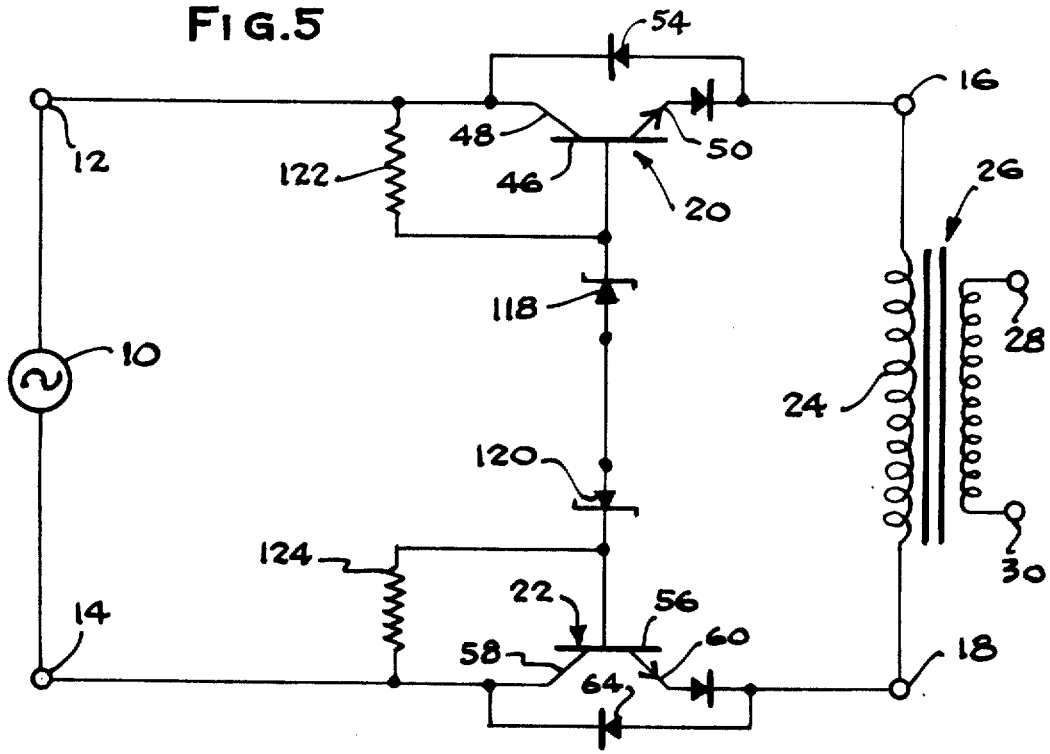
FIG. 5 is a schematic electrical circuit diagram of still another embodiment of the present invention.
Figure 6:
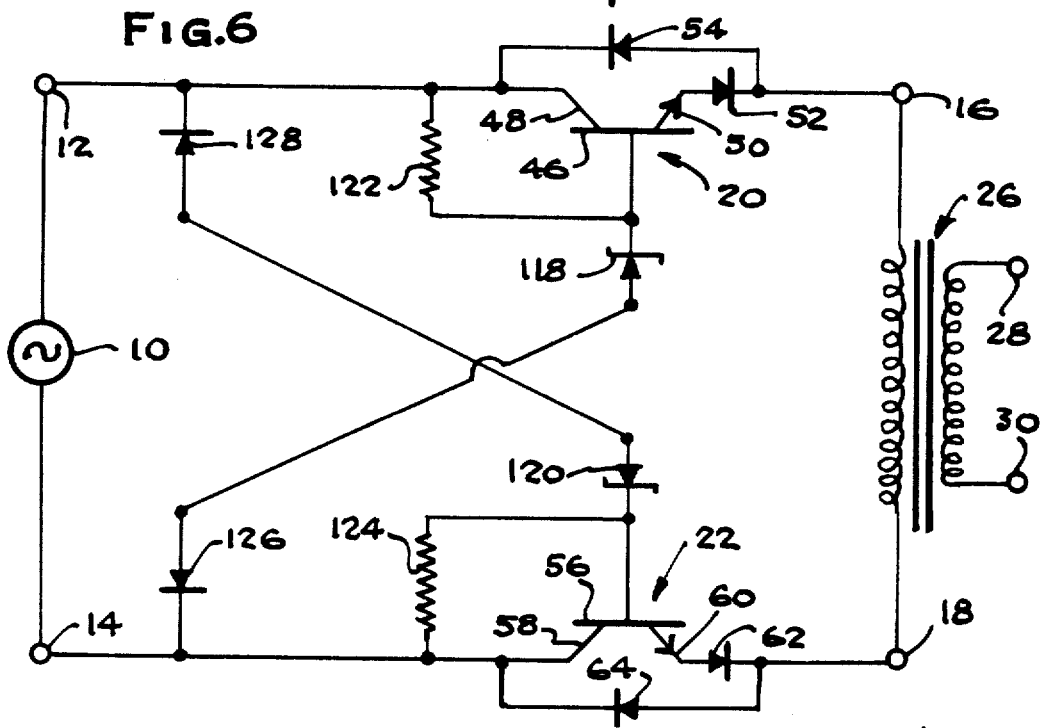
FIG. 6 is a schematic electrical circuit diagram of a modification thereof.

FIGS. 5 and 6 show two modifications of the voltage regulating device set forth in FIG. 1, and identical circuit elements bear identical reference numerals. In FIG. 5, the base 46 of the transistor 20 is interconnected with the base 56 of the transistor 22 through two zener diodes 118 and 120 connected to pass charges in opposite directions, positive charges being conducted toward the bases. A resistor 122 is connected from the input terminal 12 to the base 46 of transistor 20 to provide a breakover current for purposes of controlling transistor 22. In like manner, a resistor 124 is connected between the input terminal 14 and the base 56 of transistor 22 to provide the zener diode 120 with a potential which will break over for purposes of controlling transistor 20.

In operation, during that portion of the input cycle when the terminal 12 is positive, the transistor 20 conducts current to the output terminal 16 and the primary 24 of the transformer 26, the current returns from the terminal 18 being through the diode 64 to the terminal 14. As the amplitude of the positive potential appearing on the input terminal 12 increases, the potential on both the base 46 and the collector 48 increases until the breakover potential of the zener diode 118 is reached. At this potential, current flows through the zener diode 118, the zener diode 120 and the resistor 124 to limit the potential on the base 46 of the transistor 20 to this value. As a result, conduction through the transistor 20 is limited, thus clipping the amplitude of the sine wave. In like manner, when the terminal 14 is positive, the zener diode 120 limits the current flowing through the transistor 22, and provides an inverted clipped output wave on the terminals 28 and 30.

It is not necessary that the diodes 118 and 120 be returned through each other, as in FIG. 5, but separate diodes may be used for this purpose as set forth in FIG. 6. In the embodiment of FIG. 6, circuit elements which are identical to that of FIG. 5 bear like reference numerals. The embodiment of FIG. 6 differs from the embodiment of FIG. 5 in that zener diode 118 is connected to the input terminal 14 through a diode 126 connected to pass positive charges to the terminal 14. Also, zener diode 120 is connected to the input terminal 12 through a diode 128 connected to pass positive charges to the terminal 12. This construction avoids the potential drop from the zener diodes through the zener resistor 122 or 124.

In FIG. 6, the diodes 126 and 128 are connected to the input terminals 14 and 12, respectively. It is of course true that these diodes may be connected to either side of the bypass diodes 64 and 54, respectively, since these diodes are connected to pass positive charges toward the input terminals and bypass their respective transistors.

Those skilled in the art will undoubtedly devise many embodiments and constructions of voltage regulating devices utilizing the inventive concept here set forth. For example, it is clearly within the skill of the art to utilize the present invention for controlling the amplitude of a pulse rather than the amplitude of an alternating current signal. It is therefore intended that the scope of the present invention be not limited by the foregoing disclosure, but rather only by the appended claims.

I claim:

1. A wave amplitude regulating device adapted to be connected to a source of electrical waves, said device comprising a first and a second input terminal, a first and a second output terminal, a transistor having a base, a collector and an emitter, the collector and emitter being connected in a series circuit between the first input and the first output terminals to pass electrical waves therebetween, a transformer having a primary winding and a secondary winding, the primary winding being connected in a series circuit between the first and second input terminals, said last-mentioned series circuit including a zener diode polarized to pass electrical waves from the first input terminal to the second input terminal responsive to potentials above the zener breakdown potential, the secondary winding of said transformer being connected between the first input terminal and base of the transistor and polarized to oppose waves impressed on the transistor in the forward direction of the transistor.

2. A wave amplitude regulating device comprising the combination of claim 1 wherein the transformer secondary has more turns than the primary.

3. A wave amplitude regulating device comprising the combination of claim 1 wherein a first capacitor is connected in parallel with the primary winding of the transformer.

4. A wave amplitude regulating device comprising the combination of claim 1 wherein a second capacitor is connected in parallel with the secondary winding of the transformer 5. A wave amplitude regulating device comprising the combination of claim 1 in combination with a second transistor having a base, a collector and an emitter, the collector and emitter of said second transistor being connected in a series circuit between the second input and second output terminals, a second zener diode connected in the series circuit which includes the primary winding and the first-mentioned zener diode, said zener diodes being oppositely polarized, a second secondary winding on said transformer and connected between the second input terminal and the base of said second transistor, said second secondary winding being polarized to oppose waves impressed on said second transistor in its forward direction, a first diode connected between said first input and first output terminals, said first diode and said first transistor being oppositely polarized, and a second diode connected between said second input and second output terminals, said second diode and said second transistor being oppositely polarized.

6. A regulated power supply adapted to be connected to two terminal alternating current sources, said power supply comprising a first transistor having a base, a collector and an emitter, the collector being adapted to be connected to one of the terminals of the alternating current source, a second transistor having a base, a collector and an emitter, the collector of the second transistor being adapted to be connected to the second terminal of the alternating current source, a transformer having a primary winding and a pair of secondary windings, the primary winding being connected in a series circuit between the collectors of the first and second transistors, said series circuit including a pair of zener diodes polarized to pass current in opposite directions, one of the secondary windings of said transformer being connected between the collector and base of the first transistor and polarized to oppose charges impressed on the collector of the transistor in the forward current direction of the transistor, and the other of the secondary winding of said transformer being connected between the collector and base of the second transistor and polarized to oppose charges impressed on the collector of the transistor in the forward current direction of the transistor, a first pair of diodes connected respectively to the emitters of the first and second transistors to pass current in the forward direction of the first and second transistors, and a second pair of diodes, each diode of said second pair being connected in parallel with a diode of the first pair and the associated transistor to pass current in the opposite direction from said transistor.

7. A regulated power supply adapted to be connected to an alternating current source, said power supply comprising a first and a second input terminal, a first transister having a base, a collector and an emitter, the collector being connected to the first input terminal, a second transistor having a base, a collector and an emitter, the collector of the second transistor being connected to the second input terminals a pair of zener diodes connected respectively to the bases of the transistors respectively, each zener diode being polarized to pass current in a forward direction toward the corresponding base, first means connected to the terminal of the first of said zener diodes opposite the base of the first transistor and connecting said diode into the circuit from the second input terminal to the second output terminal, second means connected to the terminal of the second of said zener diodes opposite the base of the second transistor and connecting said diode into the circuit between the first input terminal and first output terminal, a pair of resistors, the first resistor being connected between the collector and base of the first transistor and the second resistor being connected between the collector and base of the second transistor, a first pair of diodes connected respectively to the emitters of the first and second transistors to pass current in the forward direction of the first and second transistors, and a second pair of diodes, each diode of said second pair being connected in parallel with a diode of the first pair and the associated transistor to pass current in the opposite direction from said transistor.

8. A regulated power supply according to claim 7, in which said first and second means include respective diodes in series with said zener diodes and oppositely polarized relative thereto.

9. A regulated power supply adapted to be connected to an alternating current source, said power supply comprising a first and a second input terminal, a first transistor having a base, a collector and an emitter, the collector being connected to the first input terminal, a second transistor having a base, a collector and an emitter, the collector of the second transistor being connected to the second input terminal, a pair of zener diodes connected respectively to the bases of the transistors respectively, each zener diode being polarized to be broken down when the corresponding transistor is conductive, first means connected to the terminal of the first of said zener diodes opposite the base of the first transistor and connecting said diode into the circuit from the second input terminal to the second output terminal, second means connected to the terminal of the second of said zener diodes opposite the base of the second transistor and connecting said diode into the circuit between the first input terminal and first output terminal, a pair of resistors, the first resistor being connected between the collector and base of the first transistor and the second resistor being connected between the collector and base of the second transistor, and a pair of diodes connected in parallel with the respective transistors and polarized oppositely relative to the corresponding transistors.

10. A power supply according to claim 9, in which said first and second means comprise respective first and second diodes connected in series with said respective zener diodes and oppositely polarized relative thereto.

PO-1050
(5/69)

UNITED STATES PATENT OFFICE
CERTIFICATE OF CORRECTION

Patent No. 3,593,111          Dated July 13, 1971

Inventor(s) Herbert Moerlein

It is certified that error appears in the above-identified patent and that said Letters Patent are hereby corrected as shown below:

Column 6, line 19

After "input", change "terminals" to
-- terminal, --.

Signed and sealed this 14th day of December 1971.

(SEAL)
Attest:

EDWARD M. FLETCHER, JR.　　　　ROBERT GOTTSCHALK
Attesting Officer　　　　　　　　Acting Commissioner of Patents